United States Patent Office 3,694,236

Patented Sept. 26, 1972

1

3,694,236
METHOD OF PRODUCING A DEHYDRATED FOOD PRODUCT
Ray L. Edlin, San Diego, Calif., assignor to Kelco Company, San Diego, Calif.
No Drawing. Continuation of application Ser. No. 48,845, June 11, 1970, which is a continuation of application Ser. No. 734,225, June 4, 1968, which in turn is a continuation-in-part of application Ser. No. 397,322, Sept. 17, 1964. This application June 18, 1971, Ser. No. 154,677
Int. Cl. A23b 7/02

U.S. Cl. 99—199 2 Claims

ABSTRACT OF THE DISCLOSURE

A method of producing a dehydrated food product comprising mixing a Xanthomonas hydrophilic colloid with an aqueous food suspension, the quantity of Xanthomonas colloid ranging from about 0.01 to about 1.5 percent by weight of the aqueous food suspension, and then dehydrating the aqueous food suspension. The dehydrated food product can also be produced by dry mixing a dry Xanthomonas hydrophilic colloid with a dehydrated food product.

This application is a streamlined continuation of Ser. No. 48,845, filed June 11, 1970, now abandoned, which in turn is a streamlined continuation of Ser. No. 734,225, filed June 4, 1968, now abandoned, which in turn is a continuation-in-part of Ser. No. 397,322 filed Sept. 17, 1964, now abandoned.

This invention relates to dehydrated food products and more particularly to methods and materials for improving the hydration of dehydrated foods by including therein a Xanthomonas hydrophilic colloid.

The art of dehydrating foods is an ancient one, and men for centuries have desired to remove moisture from food material so as to reduce its weight and bulk, thus making it easier to store and transport, and more especially to decrease the likelihood of food spoilage, thus making it possible to successfully store food longer by discouraging the growth of micro-organisms which require a high level of moisture for growth. For instance, bacteria usually do not grow below an equilibrium vapor pressure (e.v.p.) of 94, whereas mold usually disappears below about 75 e.v.p. Thus it becomes important to food processers to consider dehydration of foods.

In recent years, the combined rise of storage and transportation costs and availability of improved dehydration apparatus and techniques have caused food dehydration to become much more popular. Dehydration apparatus can vary from simple evaporators which boil water out of a food to vacuum evaporators, drum dryers, spray dryers (such as are used to convert milk into dry powder), continuous vacuum dehydrators (such as are used to make orange juice powders) and freeze-drying equipment which is recently coming to the fore. Although expensive, freeze-drying is extremely efficient and superior in quality, being applicable for a range of foods from semi-solids, such as meats, to powders, such as juice concentrates. A combination of this freeze-drying with dehydration known as dehydro-freezing is now used for pimientos and peas, for instance.

While these dehydration techniques are growing in use, they are still beset by problems, the solution of which

2 would make them more useful than at present. One such problem is the problem of reconstitution of dehydrated foods with water, i.e., rehydrating them. This process is usually a time-consuming one such as when dried fruits are soaked in water prior to cooking. Another such problem is the time required for dehydration. As the time required for dehydration is decreased, the processing costs are reduced due to the more efficient use of processing equipment.

It is an object of this invention to provide composite food products which are rehydrated or hydrated more rapidly and more completely, especially in the case of dried or dehydrated foods and to provide a method for so doing.

Another object of the invention is to provide such food products which upon hydration will possess improved consistency, texture, and mouth-feel as compared to similar products heretofore known and a method for so improving them.

An additional object is to provide such a food product the color of which upon reconstitution will more closely resemble the original color of the food than heretofore and to provide a method for so doing.

Still another object is to provide such a food product which is more readily soluble in aqueous or lipophilic products even when cold and a method for so doing.

Other objects of the invention will appear as the description thereof proceeds.

Generally speaking, and in accordance with an illustrative embodiment of my invention, I accomplish one or more of the above objects by incorporating a relatively small amount of a Xanthomonas hydrophilic colloid into food products which are to be hydrated, i.e., to which an aqueous medium is to be added, or rehydrated as in the case of dried foods, i.e., foods dehydrated by any convenient means. The Xanthomonas colloidal material is preferably mixed in an aqueous solution of food material prior to the dehydration thereof. It may also be admixed with a dehydrated food prior to the hydration of rehydration thereof. Suitable amounts of a Xanthomonas colloid for use in accordance with my invention have been found to be in the range of about 0.01% to about 1.5% of the weight of the aqueous food suspension to be hydrated or the weight of a dehydrated food material including the weight of the aqueous medium required for rehydration. A preferred range of such a Xanthomonas colloid for use in accordance with my invention is from 0.1% to .9%.

The amount of Xanthomonas colloid required in acordance herewith will vary depending upon the particular material employed as will be more particularly noted from Table II hereinafter set forth. In using a Xanthomonas colloid produced by the bacterium *Xanthomonas campestris* I have satisfactorily used amounts of such a colloid in the range of from about 0.1% to 0.5% of the wet weight of the food product.

An an illustrative embodiment of my invention, I have incorporated into a portion of tomato paste, about 0.25% by wet weight of colloid elaborated by the bacterium *Xanthomonas campestris* in an aqueous solution. When this mix was dehydrated and later reconstituted with sufficient water to form a palatable tomato paste, the paste had improved body and texture; had improved mouth-feel, color and flavor, and reconstituted more completely and quicker than with any other known means. In Table I below the resulting tomato paste is compared with an untreated tomato paste.

Dehydrated tomato flakes were prepared by blending tomato paste with an aqueous solution of *Xanthomonas campestris* hydrophilic colloid as aforesaid. After dehydration, the product was flaked and rehydrated. The results were as follows:

TABLE I

| Sample | Conc., percent | Dried film characteristics | Mouth-feel after rehydr. | Rehydr. facility | Brookfield viscosity 160° F., cps. |
|---|---|---|---|---|---|
| *Xanthomonas campestris* hydrophilic colloid | 0.5 | Good | Good+ | Rapid | 850 |
| *Xanthomonas campestris* hydrophilic colloid | 0.25 | do | do | do | 78 |
| Untreated | | Poor | Poor | Fair | 6 |

In the example of my invention set forth above, I used a colloid produced by the bacterium *Xanthomonas campestris.* This colloidal material is a polymer containing mannose, glucose, potassium gluconate and acetyl radicals. In such a colloid, the potassium portion can be replaced by several other cations without substantial change in the property of the material for the instant purposes. This colloid, which is a high molecular weight, exocellular material, may be prepared from the bacterium *Xanthomonas campestris,* by whole culture fermentation of a medium containing 2% to 5% commercial glucose; organic nitrogen source, dipotassium hydrogen phosphate and appropriate trace elements.

The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage, a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage, the reaction may be permitted to continue for 24 hours under the same conditions as the first stage. The culture, so acclimated for use with glucose by the aforementioned first and second stages, is then added to the final glucose medium.

In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with nine times its volume of a 3% glucose medium. In the final stage, the material produced in the second stage may be admixed with 19 times its volume of the final medium. A good final medium may contain 3% glucose, 0.5% distillers' dry solubles, 0.5% dipotassium phosphate, 0.1% magnesium sulphate, and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified, i.e., filtered or centrifuged, mixture from the fermentation. This resulting material may be further characterized as a hydrophilic colloid produced by the bacterium species, *Xanthomonas campestris.*

Alternative Xanthomonas colloidal material was prepared by repeating the above preparation procedure with certain other known Xanthomonas bacteria, namely with: *Xanthomonas incanae, Xanthomonas carotae, Xanthomonas begoniae, Xanthomonas phaseoli,* and *Xanthomonas malvacearum.*

However, these alternative Xanthomonas hydrophilic colloid materials are not full equivalents, i.e., they must be substituted in different proportions from that of the *Xanthomonas campestris.* Accordingly, equivalent Xanthomonas colloids found satisfactory for substitution for the campestris variety in the examples to be described hereinafter are listed below in Table II. Listed also are the relative proportions generally substituted for one part *Xanthomonas campestris.*

TABLE II

| Xanthomonas colloid equivalents were derived from: | Substituent colloid quantity, parts |
|---|---|
| *Xanthomonas campestris* | 1 |
| *Xanthomonas malvacearum* | 1.25 |
| *Xanthomonas carotae* | 1.25 |
| *Xanthomonas begoniae*, strain 3 | 1.65 |
| *Xanthomonas begoniae*, strain 9 | 1.1 |
| *Xanthomonas incanae* | 1.5 |
| *Xanthomonas phaseoli* | 1.1 |

The following are further examples of dehydrated food materials illustrating my invention:

EXAMPLE 1

A dehydrated vegetable soup mix

Selected vegetables are chopped and then dehydrated with the least heat necessary to drive off most of their natural moisture. This keeps them uncooked and retains their raw flavors, colors and vitamin content. These are then mixed as follows:

| | Lb. |
|---|---|
| Dehyd. Chopped vegetables | 5–10 |
| Vegetable proteins (preferably dried Dunlap, Mandarin or Manchus soy beans) | 15–25 |
| Monosodium glutamate | 4–8 |
| NaCl | 10–15 |
| Sodium nitrate | 1/40–1/20 |
| And as desired: | |
| Comm'l. milk powder | 20–30 |
| Ground sucrose | 3–7 |
| White wheat flour (or corn starch equiv. to this starch) | 20–25 |
| Condiments: pepper (black and white), marjoram, thyme, etc. | (1) |
| *Xanthomonas campestris* colloid | (2) 0.02 to 0.06 |

[1] To taste.
[2] Sufficient to constitute about 0.05% of the weight of other ingredients.

The resulting product will be observed to have excellent consistency and mouth-feel and viscosity, that is when reconstituted with the conventional amounts of water. It will also exhibit a flavor and color, when dehydrated, that is quite close to the undehydrated soup. The Xanthomonas hydrophilic colloid (i.e., the *Xanthomonas campestris* colloid) used here can be added either prior to dehydration or thereafter, for instance, upon reconstitution. However, adding it prior to dehydration will be especially advantageous since it will require no extra processing steps and will result in a superior product, having all of the necessary ingredients except the water added upon reconstitution.

Similar advantageous improvements may be effective with other varieties of dehydrated soup products such as in the following:

EXAMPLE 2

Dehydrated pea-soup

| | Parts by weight |
|---|---|
| Pea flour | 8 |
| Onion powder | 0.5 |
| Salt | 1.5 |
| Xanthomonas campestris colloid | 0.10 |
| White pepper | ½ |
| Spices | 0.5 |
| Water | 89 |

Drum dry the aqueous produce to obtain the desired dehydrated form.

The ingredients and proportions of a dehydrated soup mix or similar food product will of necessity vary, depending upon the type of soup being produced. The optimum level of Xanthomonas hydrophilic colloid to use will also vary, depending upon the characteristics desired in the finished product.

EXAMPLE 3

Celery soup

| | Lb. |
|---|---|
| Celery salt | 7 |
| Salt | 1 |
| Edible tallow | 7 |
| *Xanthomonas campestris* colloid | 0.02 |
| Soup flavoring or extracts of yeast or wheat | 25 |

EXAMPLE 4

Cream of mushroom soup mix

| | Percent |
|---|---|
| Whole milk powder | 27 |
| Wheat starch | 20 |
| Wheat flour | 15 |
| Dried mushrooms | 10 |
| Salt | 12 |
| Vegetable fat | 9 |
| Protex | 3 |
| *Xanthomonas campestris* colloid | 0.05 |
| Monosodium glutamate | 1.5 |
| Onion powder | 1.5 |

EXAMPLE 5

Dehydrated tomato soup

| | Parts |
|---|---|
| Potato flour | 64 |
| Onion powder | 5 |
| Tomato puree (25% solids) | 60 |
| Salt | 16 |
| Sugar | 12 |
| *Xanthomonas campestris* colloid | 0.15 |
| Black pepper | (1) |

1 To taste.

Dehydrate the mixture and then package in moisture-proof container.

EXAMPLE 6

Dried tomato powder

In preparing the solid tomato material whole tomatoes are sliced and peeled but not blanched as is done with other vegetables. They are then fumed in sulfur for about 20 minutes to aid in retaining their color and vitamin C content and also to improve their keeping properties. They are then dried by heating below about 150° F. so as not to darken the solid matter, until no moisture is squeezable from the material (2–3% moisture). The material is then ground to a meal or chopped into flakes. Prior to the drying process, the Xanthomonas hydrophilic colloid such as 0.05% *Xanthomonas campestris* colloid is incorporated into the solid material to be dehydrated therewith. The tomato puree may be concentrated in a vacuum pan to a heavy consistency and then dried to flakes on a drum drier.

Like most dehydrated vegetables, the tomato powder may be reconstituted with water. This is frequently accomplished merely by allowing the material to rest for a period in the cooking water prior to heating it. The reconstituted tomato paste will be improved as was above in the foregoing example of the invention.

The invention may be likewise incorporated in other dehydrated vegetables, such as freeze-dried vegetables. For instance, potatoes may be dehydrated as flakes for more economical storage and transportation. For dehydrating potato flakes, the raw potatoes are washed, cooked, steamed under pressure, mashed and dried on steam-heated rollers. The dried powdery material is thereafter scraped off and packaged. Such a process will yield about 100 parts flakes from about 400 parts raw potatoes having about 18% starch. The flakes will customarily be made up of: 12 to 15% water, 6 to 7% protein, 0.4% fat, 1.3% cellulose, 72–77% nitrogen-free extracts, and should include about 0.05% Xanthomonas hydrophilic colloid material.

Powdered ice-cream mix (of the type specified by the U.S. Army Q.C.) having the following powdered constituents:

| | Parts |
|---|---|
| Fat | 27.79 |
| Non-fat milk solids | 28.31 |
| Sugar | 40.65 |
| Stabilizer | 1.0 |
| Moisture | 2.25 |
| *Xanthomonas campestris* colloid | 1.0 |

To reconstitute, add 1.7 pounds of water to each pound of powder. This results in the following ice cream product:

| | Parts by weight |
|---|---|
| Fat | 10.22 |
| Non-fat milk solids | 10.42 |
| Sugar | 14.96 |
| Stabilizer | 0.37 |
| Water | 64.03 |
| *Xanthomonas campestris* colloid | 0.37 |

EXAMPLE 8

Instant sauces

Instant sauces, such as gravies and white sauce, will be vastly improved by the addition of a Xanthomonas colloid according to the invention. The invention gives a sauce faster and more complete rehydration properties and improves its mouth-feel, flavor and body. It also provides a rehydrated sauce having a smoother, more uniform consistency; one that will not separate upon storage. Since the viscosity of a Xanthomonas hydrophilic colloid is relatively unaffected by heat, it can be used in improving sauces to be served either cold or heated. The ingredients will vary as is known to those familiar with such foods.

The basic ingredients of rehydrated, reconstituted foods for use with the present invention will comprise an aqueous medium in which food solids are dispersed together with various addition agents, such as the inventive rehydration-promoting Xanthomonas hydrophilic colloids, sweeteners, fillers, proteinaceous matter, edible fats, animal extracts, coloring agents, yeast, monosodium glutamate, grain flours, stabilizers and others commonly used in dried foods.

In the foregoing, I have described various rehydrated food compositions apt for use with the invention. While these foods have proven especially apt for use with the rehydration-promoting agents prescribed by the invention, other foods and edible suspensions or powders-to-be-hydrated, such as instant desserts, pastry mixes and the like, will likewise employ the inventive addition agents with similar advantageous results. Even powdered condiments, such as monosodium glutamate, or liquid condiments, such as Worcestershire sauce, may employ the invention, especially for incorporation into rehydrated foods. Foods incorporating a Xanthomonas colloid in accordance with my invention include virtually all edible compositions wherein it is desired to improve facility of hydration, texture and body without any deterioration in properties due to dehydration or reconstitution processes. The invention may be employed before dehydration or thereafter and will not impair the delicate flavor or color of a food. Many foods to which any aqueous medium will be added are suitable subjects of course.

Using my invention with the above wide range of hydrated food mixtures, one need only add a Xanthomonas colloid of the type prescribed, using from about 0.01% to about 1.5% by weight of the rehydrated food product depending upon the species of Xanthomonas colloid employed, upon the rehydration facility and other effects desired and upon the type and the proportions of the food, water and other affecting ingredients.

A number of tests were performed in which food products containing thickeners were dehydrated and subsequently rehydrated in order to measure the effectiveness of a Xanthomonas hydrophilic colloid as compared with various thickeners. In these tests, tomato paste solutions were formed by mixing 16% by weight of a tomato paste containing 25% solids with 84% by weight of distilled water. To 300 gram samples of these tomato paste solutions were added various colloids which were mixed by stirring at a speed of 800 r.p.m. for 30 minutes. After the mixing had been carried out, each of the samples was heated to 160° F. in a thermostatically controlled water bath.

The samples were maintained at 160° F. for 15 minutes with periodic agitation. The heated samples were then spread in thin layers, one-eighth inch thick, in aluminum containers and dried in a forced air dryer at a temperature of 120° F. to give films of dehydrated tomatoes.

Following dehydration in the forced air dryer, the resulting films were examined. A film was rated good if it was homogeneous, and fairly uniform or continuous in coverage without curling or lumping. A film was rated as poor if it was lumpy or discontinuous. Films having ratings of fair were partially lumpy or discontinuous, but not as much so as those judged poor. Films rated as tough were very hard and quite resistant to rehydration.

The dried films were then cut into flakes and their rehydration characteristics were determined by adding 8 grams of dried tomato flakes to 150 milliliters of water maintained at 160° F. During rehydration, the mixture was subjected to intermittent stirring. The time required for rehydration was noted and the Brookfield viscosities at 160° F. of the rehydrated samples were measured.

The results of the above described tests are set forth in the following table:

The concentrations of the various colloids shown in Table III are in terms of percent by weight of the tomato paste solutions which were dehydrated in the manner described above. The consistency and mouth feel of the rehydrated materials was determined by both visual observation and the feel of the materials in the mouth. A material which was judged good or very good was completely rehydrated and had a smooth homogeneous consistency. A material judged poor or very poor had a lumpy non-homogeneous consistency and contained hard particles which had not been rehydrated. Materials judged fair had a mouth feel and consistency which were intermediate to the extremes of good or poor.

Rehydration facility as set forth in Table III refers to the time required for rehydration. Materials having a rapid rehydration were completely rehydrated after about 30 minutes. Those having incomplete rehydration facility were not rehydrated after about 3 hours of treatment. Those materials having a moderate or fair rehydration facility required several hours to obtain rehydration. Completion of rehydration was determined by both visual observation and by placing the materials in the mouth to determine whether they contained lumps and were non-homogeneous. Complete rehydration was indicated by a homogeneous consistency and the absence of lumps.

The Brookfield viscosities set forth in Table III were obtained at 160° F. using a Brookfield Viscometer, Model LVT, using the appropriate spindle rotating at a speed of 60 r.p.m. A number 1 spindle is used at viscosities up to 100 cps., a number 2 spindle at viscosities between 100 and 500 cps., a number 3 spindle at viscosities between 500 and 2,000 cps., aod a number 4 spindle at viscosities above 2,000 cps. The Brookfield viscosities of the materials after rehydration are closely related to the completeness of rehydration. If rehydration was incomplete or very slow, the resulting material had a Brookfield viscosity which was relatively low.

As shown in Table III, the test samples containing a Xanthomonas hydrophilic colloid according to my invention gave dried films whose characteristics were good. The dehydrated food samples containing a Xanthomonas colloid were found to have a better consistency and mouth feel after rehydration than any of the test samples containing a thickener other than a Xanthomonas colloid. Lastly, the time required for rehydration, i.e., rehydration facility, was less with the dehydrated test samples containing a Xanthomonas colloid than with those containing any of the other thickening agents.

Still further tests were conducted in the general manner set forth above. In these tests (Table IV), the Brookfield viscosities of the tomato paste solutions prior to dehydration were determined at temperatures of 72° F. and 160° F. The Brookfield viscosities were also determined at temperatures of 160° F. immediately after rehydration and later at 72° F. after cooling of the rehydrated materials. As in Table III, the concentrations

TABLE III

| Sample | Conc., percent | Dried film characteristics | Consistency and mouth-feel after rehydration | Rehydration facility | Brookfield viscosity 160° F., cps |
|---|---|---|---|---|---|
| *Xanthomonas campestris* hydrophilic colloid | 0.5 | Good | Very good | Rapid | 850 |
| *Xanthomonas campestris* hydrophilic colloid | 0.25 | do | do | do | 78 |
| Control | | Poor | Poor | Moderate | 6 |
| Guar gum | 0.5 | Fair | Fairly good | do | 84 |
| Gum tragacanth | 0.5 | do | Fair | Fair | 63 |
| Locust bean gum | 0.5 | Poor | do | Very slow | 46 |
| Carboxymethyl cellulose | 0.5 | Good | Very poor | Incomplete | 6 |
| Methyl cellulose | 0.5 | Poor | do | do | 6 |
| Cleargel; starch | 5.0 | Fair | do | do | 5 |
| Gum karaya | 0.5 | Good | Poor | do | 40 |
| Gum arabic | 0.5 | Fair | do | do | 10 |
| Irish moss | 0.5 | Poor | Very poor | Slow | 65 |
| Low methoxy pectin | 0.5 | Good | Fair | Fair | 45 |
| Dextran | 0.5 | Fair | do | Slow | 104 | set forth in the following table are percentages by weight of the tomato paste solutions prior to dehydration.

TABLE IV

| Sample | Conc., percent | Before dehydration, Brookfield viscosity | | Time to dehydrate, hrs. | Film properties | Time to rehydration | After rehydration, Brookfield vis. | |
|---|---|---|---|---|---|---|---|---|
| | | 72° F. | 160° F. | | | | 160° F. | 72° F. |
| *Xanthomonas campestris* hydrophilic colloid | 0.5 | 770 | 720 | 2 | Good | 30 minutes | 728 | 732 |
| Carrageenan | 1.5 | 355 | 300 | 3 | do | 45 minutes | 41 | Gelled |
| Dextran | 5.0 | 1,600 | 760 | 10 | Tough | Inc. after 3 hours | 48 | 31 |
| Gum arabic | 3.0 | 90 | 77 | 6 | Fair | do | 7 | 7 |
| Low methoxy pectin | 3.0 | 1,130 | 400 | 8 | Tough | 1.5 hours | 26 | 500 |
| Gelatin | 3.0 | 370 | 81 | 7 | do | Inc. after 3 hours | 15 | 24 |
| Agar | 3.0 | 600 | 121 | 10 | do | do | 19 | Gelled |
| Control | | 8 | 7 | 3 | Poor | 1 hour | 7 | 7 |

As shown by the data in Table IV, the sample containing a Xanthomonas colloid required less time for both dehydration and rehydration than the other samples. The fact that the sample containing a Xanthomonas colloid required less time for dehydration is quite surprising since this sample had the relatively high viscosity of 720 cps. at 160° F. prior to dehydration. The other test samples, with the exception of the dextran-containing sample, were all considerably less viscous at 160° F. and yet required considerably more time for dehydration. This was true even of the control sample which had a viscosity of only 7 cps. at 160° F.

Further, the test data in Table IV demonstrate the relatively constant viscosity characteristics imparted by a Xanthomonas colloid irrespective of the temperature of the test sample. None of the other thickeners exhibited this property and, in fact, gave viscosities at 160° F. which were, in general, much less than their viscosities at 72° F. The uniform viscosity characteristics of a food product of my invention containing a Xanthomonas colloid are very desirable in food products such as soups which are served hot. Dehydrated soup mixes of my invention do not thin out to any extent when heated and, thus may be tailored to give the desired consistency and mouth feel at serving temperatures.

The data in Table IV further demonstrate the stability of a Xanthomonas colloid to dehydration processing. On rehydration the viscosity of the test sample containing a Xanthomonas colloid was essentially unchanged from its viscosity prior to dehydration. However, the other thickeners tested gave products whose viscosity after rehydration was generally considerably reduced from that prior to dehydration.

Several advantages are provided by the relatively viscous character of an aqueous food mixture during dehydration which contains a Xanthomonas colloid. The loss of volatile food components during dehydration is somewhat reduced to provide a dehydrated product which more closely resembles the product prior to dehydration. Also, a relatively viscous aqueous food mixture is easier to handle since it has less tendency to splash than a relatively thin food mixture. An aqueous food mixture containing a Xanthomonas colloid has pseudoplastic viscosity characteristics, i.e., the viscosity changes instantaneously with respect to shear. As the shear is increased, the viscosity is decreased such that the food mixture can be readily pumped, etc. while still having a high viscosity while at rest or under conditions of reduced shear.

My invention is quite suitable for treatment of food products having various degrees of acidity and alkalinity. Thus, for example, it is suitable for dehydration of fruit juices or fruit purees having acid pH's of about 2.5 to about 3.0 or highly alkaline food products which would degrade thickeners. Also, unlike many thickeners, it is not necessary to heat a Xanthomonas colloid in order to activate it. This will permit the use of my process at relatively low dehydration temperatures as required for more heat sensitive food products, and, for that matter, permits preparation of an improved dehydrated food product merely by dry mixing a dry Xanthomonas colloid with a dehydrated food product.

I claim:
1. A process for forming an improved dehydrated food product, said process comprising mixing a dry Xanthomonas hydrophilic colloid with a dry dehydrated food product, said Xanthomonas hydrophilic colloid being present in an amount ranging from about 0.01 percent to about 1.5 percent of the hydrated weight of said food product.

2. The process of claim 1 wherein said Xanthomonas hydrophilic colloid is mixed with said dehydrated food product in an amount ranging from 0.1 to 0.9 percent of the hydrated weight of said food product.

References Cited

UNITED STATES PATENTS 3,066,030   11/1962   Eolkin _____ 99—204

OTHER REFERENCES

Manufacturing Chemist, May 1960, pp. 206, 207, 208.

MORRIS O. WOLK, Primary Examiner

S. B. DAVIS, Assistant Examiner

U.S. Cl. X.R.

99—204